July 17, 1923. 1,461,978
J. G. FEIL
VEHICLE WHEEL
Filed Aug. 24, 1922 3 Sheets-Sheet 1
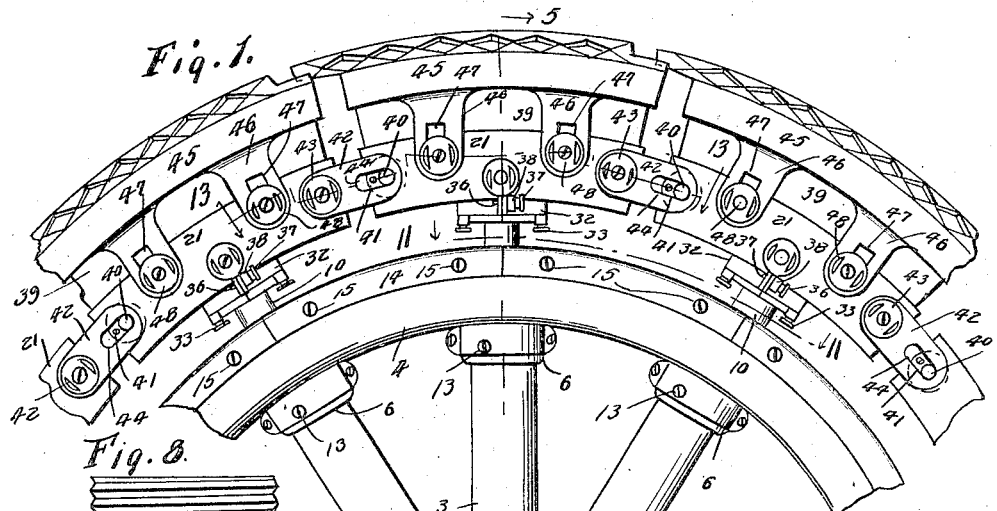
Inventor
J. G. Feil July 17, 1923.
J. G. FEIL
1,461,978
VEHICLE WHEEL
Filed Aug. 24, 1922
3 Sheets-Sheet 2
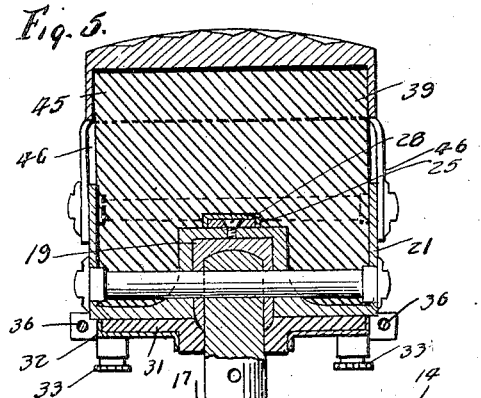
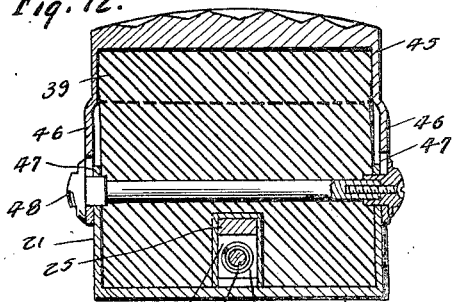
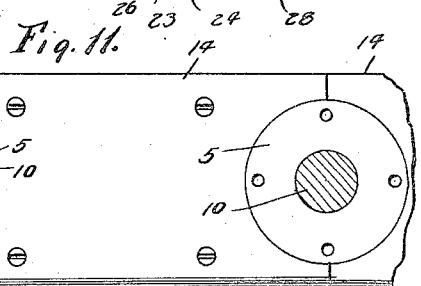
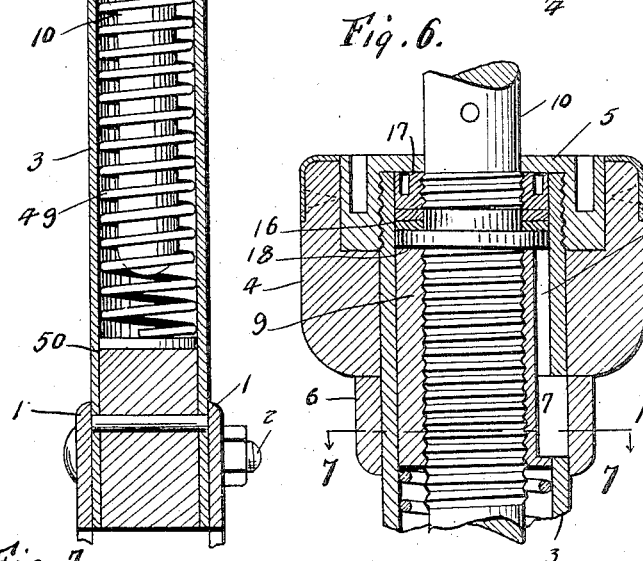
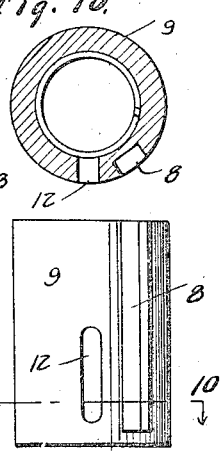
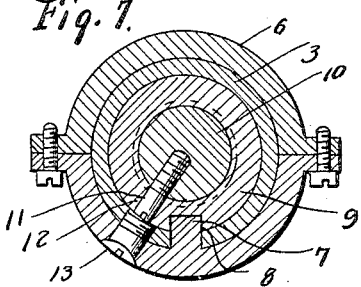
Inventor
J. G. Feil.

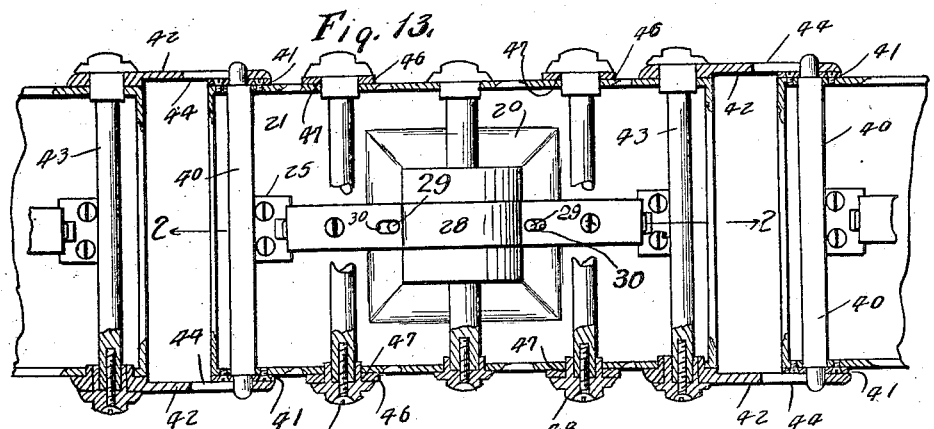

Patented July 17, 1923.

1,461,978

UNITED STATES PATENT OFFICE.

JOHN G. FEIL, OF BLACKSTONE, VIRGINIA.

VEHICLE WHEEL.

Application filed August 24, 1922. Serial No. 584,066.

*To all whom it may concern:*

Be it known that I, JOHN G. FEIL, a citizen of the United States, residing at Blackstone, in the county of Nottoway and State of Virginia, have invented certain new and useful Improvements in Vehicle Wheels; and I do hereby declare the following to be a full, clear, and exact description of the invention, such as will enable others skilled in the art to which it appertains to make and use the same.

This invention has for its object the provision of a vehicle wheel having a resilient tread and designed for automobiles and analogous motor vehicles having the wheels equipped with pneumatic tires.

The principal object of the invention is the provision of a wheel possessing substantially all the advantages of wheels equipped with pneumatic tires but free from the disadvantages resulting from puncture, blowout, rim cut and loss of air.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of portion of a vehicle wheel embodying the invention,

Figure 2 is a sectional detail in the plane of the wheel on the line 2—2 of Figure 13, Figure 3 is a detail view of an end portion of one of the boxes pivotally connected to the outer end of the telescoping spoke member, parts being broken away.

Figure 4 is a detail perspective view of one of the lock bars,

Figure 5 is a transverse section on the line 5—5 of Figure 1, showing the parts on a larger scale, Figure 6 is an enlarged sectional detail of the felloe, the spoke member attached thereto, the sleeve slidable within the fixed spoke member and the telescoping spoke member to which said sleeve is adjustably connected, Figure 7 is a section on the line 7—7 of Figure 6, Figure 8 is an elevation of the outer end of a fixed or inner spoke member, Figure 9 is a side view of the sleeve which is adjustable on the telescoping spoke member and slidable within the inner or fixed spoke member, Figure 10 is a section on the line 10—10 of Figure 9, Figure 11 is a sectional detail on the line 11—11 of Figure 1, looking in the direction of the arrows, Figure 12 is a sectional detail on the line 12—12 of Figure 2, Figure 13 is a sectional detail on the line 13—13 of Figure 1, looking in the direction of the arrows, parts being broken away, Figure 14 is a detail view of the outer end of a telescoping tread member and the intermediate portion of the box pivoted thereto, showing the packing and the means for retaining the packing in place, parts being broken away, Figure 15 is a sectional detail on the line 15—15 of Figure 14, looking in the direction of the arrows, Figure 16 is a side view of the sectional cap for retaining the packing in position, Figure 17 is a plan view of the packing, an end portion being broken away, Figure 18 is a side view of the frame which supports the lock bars which coact with the box and the head applied to the outer end of a telescoping spoke member, Figure 19 is an end view of the frame shown in Figure 18, and Figure 20 is a detail view of one of the abutment plates coacting with a lock bar and its actuating spring.

Corresponding and like parts are referred to in the following description and designated in the several views of the drawings by like reference characters.

The wheel comprises a hub, telescoping spokes, a fixed felloe and a resilient sectional rim. The hub comprises companion plates 1 between which the inner ends of the spokes are secured by means of bolts 2 or like fastenings. The spokes comprise inner tubular members 3 which are made fast at their inner ends to the hub and at their outer ends to the felloe 4. A nut 5 is threaded upon the outer end of each of the spoke members 3 and is let into the felloe 4 so as to come flush with the outer side thereof. A band 6 is clamped about each spoke member 3 adjacent the inner side of the felloe 4 and is provided upon its inner side with a tongue 7 which passes through an opening in a side of the spoke member 3 and enters an elongated opening 8 formed in a side of a sleeve 9 threaded upon the outer spoke member 10 which telescopes within the inner spoke member 3. In this manner, the band 6 is prevented from turning upon the spoke member 3 and the sleeve 9 is prevented from turning within said spoke member 3 and is free to move therein with the spoke member 10. The sleeve 9 is secured to the spoke member 10 in the required adjusted position by means of a screw 11 which is threaded into the spoke member 10 and has its outer end projecting into a slot 12 formed in a side of the sleeve 9. This prevents turning of the spoke member 10 in the sleeve 9 after the parts have been adjusted and the screw 11 positioned so that its inner end engages the member 10 and its outer end projects into the slot 12. When it is required to adjust the spoke member 10 in the sleeve 9, the screw 11 must be removed and after the adjustment has been effected, the spoke member 10 must be adjusted so that the opening formed therein to receive the screw 11 must register with the slot 12, whereby the screw 11 may be properly positioned. Registering openings are formed in the band 6 and spoke member 3 to receive a screw 13 and these openings admit of the removal and replacement of the screw 11.

Plates 14 are secured to the outer side of the felloe 4 and reinforce and strengthen the same. The ends of the plates 14 are notched to fit about the outer ends of the nuts 5. The edges of the plates 14 are bent to embrace opposite sides of the felloe 4 to which they are secured by screws or analogous fastenings 15. The plates 14 form in effect a sectional felloe band. Packing 16 is applied to the outer portion of each spoke member 10 and is confined between a nut 17 and a collar or shoulder 18. The packing 16 maintains a close joint between the spoke members. This packing is adjusted by means of the nut 17.

To the outer end of each spoke member 10 is fitted a circular head 19 which cooperates with a socket 20 secured to the bottom of a box 21 through which the outer end of the spoke member 10 projects. Depressions 22 are formed in the outer side of the head 19 at diametrically opposite points and receive the inner ends of lock bars 23 which are urged inwardly by means of expansible helical springs 24 mounted thereon. The lock bars 23 are mounted in a frame 25 which is secured within the box 21 and has its middle portion arched to extend over the sockets 20. The ends of the frame 25 have openings through which the outer ends of the lock bars 23 pass and said first mentioned ends are provided with feet which are attached to the bottom of the box 21. The expansible helical springs 24 are confined between shoulders of the bars 23 and plates 26 which are adjustable to regulate the tension of the springs. The inner and outer edge portions of the plates 26 engage grooves 27 formed in portions of the frame 25. A housing 28 encloses the frame 25 and lock bars 23 and prevents anything interfering with such parts. Openings 29 formed in a side of the inner end portions of the lock bars 23 are adapted to receive elements, not shown, such as rods which are adapted to be used as pries for forcing the lock bars 23 outwardly to clear the head 19 when it is required to disengage the box 21 from the spoke member 10. Corresponding openings 30 are formed in the frame 25 and housing 28 to admit of said prying elements engaging the openings 29 of the lock bars 23 when it is required to disengage said lock bars from the head 19.

A packing 31, usually of rubber, is applied to the bottom side of the box 21 facing the felloe of the wheel so as to maintain a close joint between the spoke member 10 and the box 21, whereby to exclude moisture, dust and other foreign matter. This packing 31 is retained in place by means of a sectional cap 32. Screws 33, or analogous fastenings, secure the sections of the cap 32 to the bottom of the box 21 and pass through transversely elongated openings 34 formed in the sections of the cap. Expansible helical springs 35, mounted upon the bolts 33 and confined between the heads thereof and the sections of the cap 32, yieldably press said cap to the bottom of the box 21. The sections comprising the cap 32 are yieldably connected by means of screws 36 and springs 37, the latter being of the expansible helical type and confined between the heads of the screws 36 and parts of the section through which said screws loosely pass. A telescoping housing 38 encloses each of the springs 37 and the head portion of the screw 36. A rubber block 39 is fitted in each of the boxes 21 and projects therefrom a distance to provide a soft tread. Each of the boxes 21 is provided at one end with a rod or bar 40, whose opposite end portions are reduced and project through openings formed in opposite sides of the box and are retained in place by means of washers 41 secured to the outer side of the box. Links 42 are secured to the opposite end portions of the box by means of a bolt 43, said links projecting and having longitudinal slots 44 in the projecting ends to receive the reduced ends of the rod or bar 40 of the adjacent box, whereby the boxes are coupled and are adapted to have a free rocking and inward movement.

When preferred, metal tread sections 45 may be provided and fitted to the projecting portions of the resilient blocks 39. The inner sides of the tread sections 45 are hollow to receive the outer portions of the blocks 39 to which they are fitted. Ears 46 project inwardly on opposite sides of the tread sections 45 and are formed with radial slots 47 to receive bolts 48 which pass through the boxes 21 and hold the tread sections in place. Opposite end portions of adjacent tread sections 45 overlap so as to maintain in effect an unbroken metallic tread. The metal tread sections 45 sustain the wear and are cushioned by the rubber blocks 39 and the action of the telescoping spokes which contain air and load sustaining springs.

An expansible helical spring 49 is disposed within each of the spoke members 3 and is confined between an abutment 50 and the sleeve 9. The tension of the spring 49 may be regulated by adjustment of the sleeve 9 in the manner herein stated. In addition to the action of the spring 49 in sustaining the load, it is to be understood that the air confined in the spoke section 3 also operates to sustain the load, it being understood that the inner end of the spoke section 3 is hermetically sealed and the packing 16 maintains a close joint between the outer end of the spoke section 3 and the telescoping spoke section 10. The tension of the spring 49 is regulated by disconnecting the outer end of the spoke section 10 from the box 21 and removing the screw 11, after which the spoke section 10 is rotated to cause the sleeve 9 to move inward or outward as required. It is further observed that the metallic tread sections 45 may be dispensed with if desired, in which case the rubber blocks 39 sustain the wear and constitute the tread of the wheel.

What is claimed is:

1. In a wheel of the character specified, a tubular spoke member, a companion spoke member telescoping therewith, a sleeve threaded on the telescoping spoke member and disposed within the tubular spoke member, a band clamped about the tubular spoke member and having a projection passing through an opening in a side thereof and engaging said sleeve to prevent turning thereof, means insertable through registering openings formed in said band and tubular spoke member to engage said sleeve and the spoke member upon which it is mounted to prevent turning thereof, said means having longitudinal play in the sleeve, and an expansible helical spring within the tubular spoke member and engaging the said sleeve and adapted to have its effective tension regulated thereby.

2. In a wheel of the character specified, a felloe, telescoping spokes in cooperative relation with the felloe, nuts let into the outer side of the felloe and engaging the inner spoke members, and plates secured to the outer side of the felloe between adjacent spokes and having their longitudinal edge portions bent to embrace opposite sides of the felloe to which they are attached and having their ends notched to receive the said nuts which extend through the openings formed by the matching notches.

3. In a wheel of the character specified, telescoping spokes, tread members at the outer ends of the movable spoke members, links at one end of each tread member and secured to opposite sides thereof and projecting outwardly therefrom and having longitudinal slots in their projecting ends, and lateral elements at the other ends of the tread members to engage the slots in the projecting ends of said links.

4. In a wheel of the character specified, comprising telescoping spokes, tread members at the outer ends of the movable spoke members, a rod at one end of each tread member having opposite ends reduced and projecting beyond the sides thereof, elements receiving the reduced ends of the rod and secured to opposite sides of the tread member and engaging the shoulders formed by reducing the ends of said rod whereby to hold the latter in place, and links secured to opposite sides of the adjacent tread member and projecting and having longitudinal slots in the projecting ends to receive the reduced ends of the said rod.

5. In a wheel of the character specified, embodying telescoping spokes, circular heads pivoted to the outer ends of the telescoping spoke members, a tread member pivoted intermediate its ends to the outer end of each telescoping spoke member, and lock bars at opposite ends of the tread member and having their inner ends engaging the circular head of the telescoping spoke member at diametrically opposite points.

6. In a wheel of the character specified comprising telescoping spokes, circular heads pivoted to the outer ends of the telescoping spoke members, a tread member at the outer end of each telescoping spoke member, a socket carried by the tread member and coacting with said circular heads, and lock bars at opposite ends of the tread member passing loosely through said socket and engaging the circular head at diametrically opposite ponts.

7. In a wheel of the character specified comprising telescoping spokes, circular heads pivoted to the outer ends of the telescoping spoke members, a tread member at the outer end of each telescoping spoke member, a socket carried by the tread member and coacting with said circular heads, lock bars at opposite ends of the tread member passing loosely through said socket and engaging the circular head at diametrically opposite points, and a housing enclosing the socket and lock bars.

8. In a wheel of the character specified, embodying telescoping spokes, a circular head pivoted to the outer end of each telescoping spoke member, a tread member, a socket carried by the tread member and coacting with the circular head, a frame on the tread member, lock bars mounted in the frame and having their inner ends passing loosely through the socket and engaging the circular head at diametrically opposite points, expansible helical springs mounted on the lock bars and urging them inwardly, abutments for the outer ends of said springs having adjustable connection with the frame for varying the tension of the springs, and a housing enclosing said frame and the parts mounted thereon.

9. In a wheel of the character specified, embodying telescoping spokes, a tread member pivoted to the outer end of each telescoping spoke member, a packing between the tread member and spokes, retaining means for holding the packing in place, said retaining means embodying sections, means for yieldably connecting the sections, and other means for yieldably connecting each of said sections to the tread member.

10. In a wheel of the character specified, embodying telescoping spokes, a tread member pivoted to the outer end of each telescoping spoke member, a packing for maintaining a close joint between the spokes and tread member, a sectional cap engaging the packing, means yieldably connecting the sections of the cap, and other means yieldably connecting the sectional cap to the tread member.

11. In a wheel of the character specified, embodying telescoping spokes, a tread member pivotally connected to the outer end of each telescoping spoke member, a resilient block carried by each tread member, and a metallic tread section having adjustable connection with each tread member and arranged so that adjacent ends of the several tread sections overlap to provide an unbroken or continuous tread.

12. In a wheel of the character specified, embodying telescoping spokes, tread members pivoted to the outer ends of the telescoping spoke members, links adjustably connecting the tread members, resilient blocks fitted to the outer side of each tread member, metallic tread section seated upon the resilient blocks and having their end portions overlapped and provided at opposite sides with radially slotted elements embracing opposite sides of the respectve tread members, and means carried by the tread members and passing through the radial slots of the side elements of the tread sections.

In testimony whereof I affix my signature in presence of two witnesses.

JOHN G. FEIL.

Witnesses:
CARL L. RANK,
L. N. FURNEY.